(12) United States Patent
Sasada et al.

(10) Patent No.: US 10,291,903 B2
(45) Date of Patent: May 14, 2019

(54) STEREO CAMERA (71) Applicant: Hitachi Automotive Systems, Ltd., Hitachinaka-shi, Ibaraki (JP)

(72) Inventors: Yoshiyuki Sasada, Hitachinaka (JP); Ken Ohsumi, Hitachinaka (JP); Kazuo Matsuura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 113 days.

(21) Appl. No.: 15/102,010

(22) PCT Filed: Jan. 7, 2015

(86) PCT No.: PCT/JP2015/050194
§ 371 (c)(1),
(2) Date: Jun. 6, 2016

(87) PCT Pub. No.: WO2015/122210
PCT Pub. Date: Aug. 20, 2015

(65) Prior Publication Data
US 2016/0309138 A1 Oct. 20, 2016

(30) Foreign Application Priority Data

Feb. 14, 2014 (JP) .................................. 2014-026289

(51) Int. Cl.
*H04N 13/00* (2018.01)
*H04N 13/239* (2018.01)
(Continued)

(52) U.S. Cl.
CPC ........... *H04N 13/239* (2018.05); *G01C 3/085* (2013.01); *G03B 7/00* (2013.01); *G03B 35/08* (2013.01);
(Continued)

(58) Field of Classification Search
None
See application file for complete search history.

(56) References Cited

U.S. PATENT DOCUMENTS 5,535,144 A * 7/1996 Kise .................... B60K 31/0008
702/158
5,864,360 A 1/1999 Okauchi et al.
(Continued)

FOREIGN PATENT DOCUMENTS

| CN | 116352 A | 10/1997 |
|---|---|---|
| JP | 7-298308 A | 11/1995 |

(Continued)

OTHER PUBLICATIONS

Japanese-language Office Action issued in counterpart Japanese Application No. 2015-562759 dated Feb. 21, 2017 with English translation (Eight (8) pages).
(Continued)

*Primary Examiner* — Jefferey F Harold
*Assistant Examiner* — Humam M Satti
(74) *Attorney, Agent, or Firm* — Crowell & Moring LLP (57) ABSTRACT

In order to obtain a low-cost stereo camera which can decrease the load of software-based calibration, a stereo camera is provided with a first vehicle-mounted camera which comprises a first lens unit and a first imaging element, and a second vehicle-mounted camera which comprises a second lens unit and a second imaging element. This stereo camera is characterized in that the first imaging element has a first sensitivity value recording unit in which sensitivity values of the first imaging element are recorded, and the second imaging element has a second sensitivity value recording unit in which sensitivity values of the second imaging element are recorded, wherein the sensitivity variation width between the sensitivity values of the first imaging element recorded in the first sensitivity value recording unit (Continued)

and the sensitivity values of the second imaging element recorded in the second sensitivity value recording unit is within a preset reference width.

4 Claims, 5 Drawing Sheets

(51) Int. Cl.
    *G03B 35/08*     (2006.01)
    *G03B 7/00*     (2014.01)
    *G01C 3/08*     (2006.01)
    *H04N 5/225*     (2006.01)
    *H04N 17/00*     (2006.01)
    *B60R 11/04*     (2006.01)

(52) U.S. Cl.
    CPC ......... *H04N 5/2254* (2013.01); *H04N 5/2256* (2013.01); *H04N 5/2258* (2013.01); *H04N 17/002* (2013.01); *B60R 11/04* (2013.01)

(56) References Cited

U.S. PATENT DOCUMENTS

| | | | |
|---|---|---|---|
| 6,396,946 B1 | 5/2002 | Sogawa | |
| 6,507,359 B1 | 1/2003 | Muramoto et al. | |
| 7,956,886 B2* | 6/2011 | Murayama | H04N 13/246 348/42 |
| 8,164,655 B2* | 4/2012 | Lablans | H04N 5/775 348/143 |
| 2001/0043786 A1 | 11/2001 | Takahashi et al. | |
| 2003/0020814 A1* | 1/2003 | Ono | H04N 5/225 348/220.1 |
| 2008/0055412 A1* | 3/2008 | Tanaka | G08G 1/04 348/159 |
| 2008/0199069 A1* | 8/2008 | Schick | G01S 11/12 382/154 |
| 2011/0012997 A1* | 1/2011 | Koguchi | H04N 13/296 348/47 |
| 2013/0107014 A1 | 5/2013 | Masuda | |
| 2015/0146029 A1* | 5/2015 | Venkataraman | H04N 5/23232 348/218.1 |

FOREIGN PATENT DOCUMENTS

| | | |
|---|---|---|
| JP | 11-211469 A | 8/1999 |
| JP | 2003-125257 A | 4/2003 |
| JP | 2006-74076 A | 3/2006 |
| JP | 2010-135984 A | 6/2010 |
| JP | 2011-232771 A | 11/2011 |
| JP | 2013-187782 A | 9/2013 |
| WO | WO 2012/014708 A1 | 2/2012 |

OTHER PUBLICATIONS

Extended European Search Report issued in counterpart European Application No. 15749084.8 dated Jul. 21, 2017 (11 pages).
International Search Report (PCT/ISA/210) issued in PCT Application No. PCT/JP2015/050194 dated Apr. 7, 2015 with English translation (Four (4) pages).
Japanese-language Written Opinion (PCT/ISA/237) issued in PCT Application No. PCT/JP2015/050194 dated Apr. 7, 2015 (Four (4) pages).
Chinese Office Action issued in counterpart Application No. 201580005185.8 dated Mar. 5, 2018 with English translation (11 pages).

* cited by examiner

DIAGRAM VIEWED FROM DIRECTION OF ARROW B

FIG. 4

DIAGRAM VIEWED FROM DIRECTION OF ARROW C

STEREO CAMERA

TECHNICAL FIELD

The present invention relates to a stereo camera mounted on a vehicle.

BACKGROUND ART

In recent years, mounting of an image processing system in a vehicle has been greatly expanded. It is especially significant for a stereo camera for image processing to match sensitivity of the right and left cameras to each other, for ensuring performance.

For example, technologies of a compound-eye imaging device for adjusting signal levels of each imaging element so as to be identical when imaging an identical subject with the plurality of imaging elements are disclosed in PTL 1. The compound-eye imaging device disclosed in PTL 1 includes a sensitivity adjustment mechanism (diaphragm) driven by a motor, which is adjusted after the factory shipment.

CITATION LIST

Patent Literature

PTL 1: JP 2010-135984 A

SUMMARY OF INVENTION

Technical Problem

In a vehicle-mounted stereo camera, the provision of the sensitivity adjustment mechanism causes an increase in costs, and the operation of adjustment mechanism (motor) may cause parallelization and sensitivity of right and left images to be out of adjustment, so that it is difficult to ensure accuracy in parallax calculation.

However, a purchase of an expensive lens and imaging element or complicated calibration in software-base are needed when lenses having diaphragms with same aperture values in the right and left sides and the imaging elements having the same sensitivity are selected for use.

The present invention has an object to provide a low-cost stereo camera which can decrease the load of software-based calibration.

Solution to Problem

In order to solve the above-described problem, for example, a configuration described in claims is employed. The present disclosure includes a plurality of means for solving the above-described problem. As an example thereof, there is provided a stereo camera that includes a first vehicle-mounted camera including a first lens unit and a first imaging element configured to perform imaging via the first lens unit, a second vehicle-mounted camera including a second lens unit and a second imaging element configured to perform imaging via the second lens unit. The stereo camera is characterized in that the first imaging element includes a first sensitivity value recording unit in which a sensitivity value of the first imaging element is recorded, the second imaging element includes a second sensitivity value recording unit in which the sensitivity value of the second imaging element is recorded, and a sensitivity variation width between the sensitivity values of the first imaging element recorded in the first sensitivity value recording unit and the sensitivity values of the second imaging element recorded in the second sensitivity value recording unit is within a predetermined reference width.

Advantageous Effects of Invention

According to the present invention, the load of software-based calibration can be decreased at low cost. Any issues, configurations, and effects other than those described above will become apparent by reference to the following description of embodiments.

DESCRIPTION OF EMBODIMENTS

Hereinafter, one embodiment of the present invention is described with reference to the attached drawings. When a configuration of a stereo camera is described hereinafter, description of a component having common parts in the right and left may be made by omitting "R" and "L" after reference numeral. As the configuration, the same applies to the one to which "R" and "L" are appended.

The stereo camera according to the embodiment is a vehicle-mounted stereo camera, and captures images of an area in front of a vehicle via a windshield of the vehicle.

Figure 1:
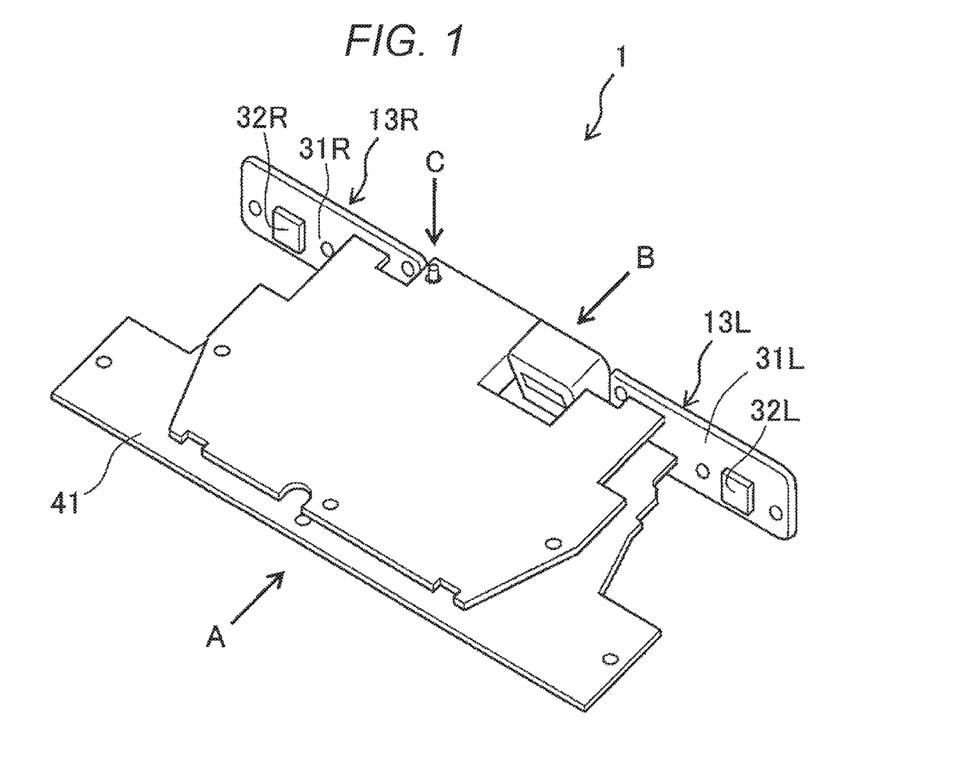
FIG. 1 is a perspective view for describing arrangement of a substrate of a stereo camera.
Figure 2:
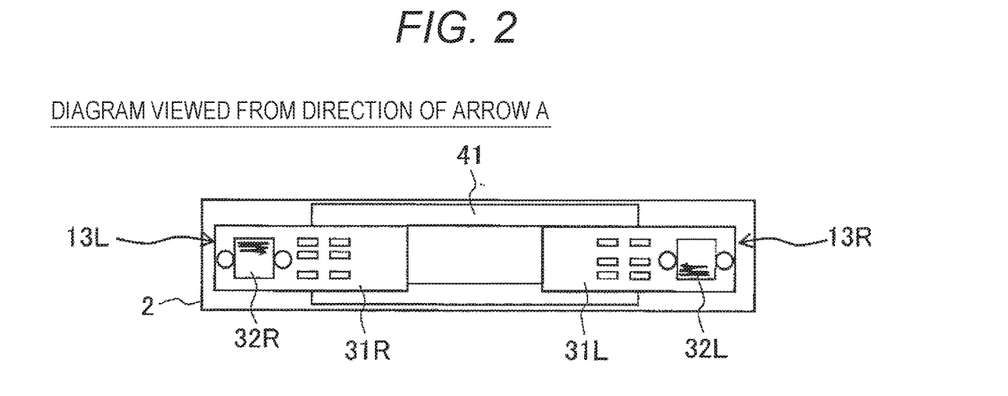
FIG. 2 is a diagram viewed from a direction of arrow A in FIG. 1.
Figure 3:
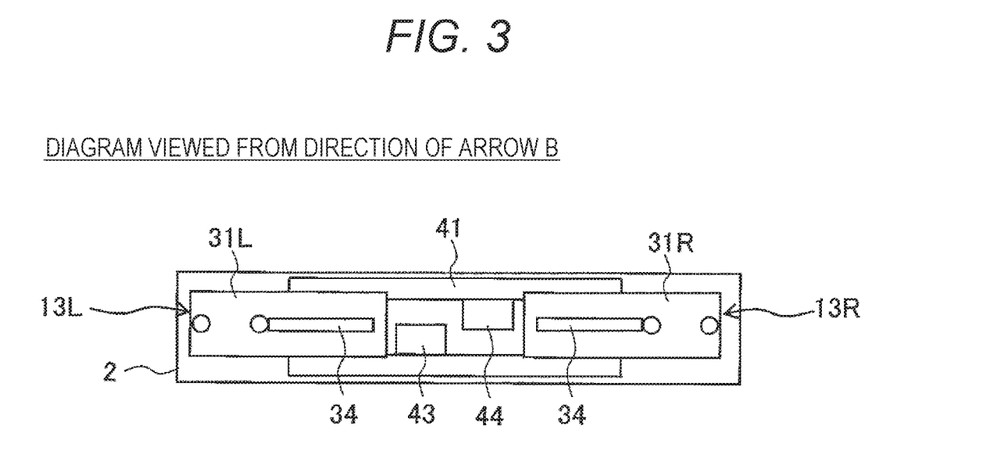
FIG. 3 is a diagram viewed from a direction of arrow B in FIG. 1.
Figure 4:
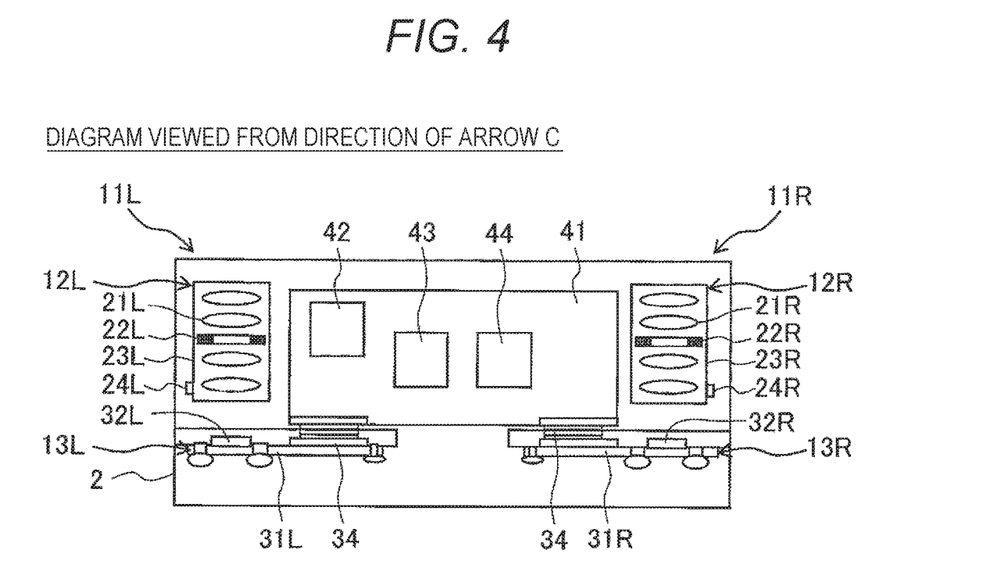
FIG. 4 is a diagram viewed from a direction of arrow C in FIG. 1.

FIG. 1 is a perspective view for describing arrangement of a substrate of the stereo camera. FIG. 2 is diagram viewed from a direction of arrow A in FIG. 1. FIG. 3 is a diagram viewed from a direction of arrow B in FIG. 1. FIG. 4 is diagram viewed from a direction of arrow C in FIG. 1.

As illustrated in FIG. 4, a stereo camera 1 includes two vehicle-mounted cameras 11 forming a pair of right and left. The stereo camera 1 includes a first vehicle-mounted camera 11R arranged at a right side in a vehicle width direction and a second vehicle-mounted camera 11L arranged at a left side in the vehicle width direction. The first vehicle-mounted camera 11R and the second vehicle-mounted camera 11L are housed in a single case 2, while being integrally fixed to each other. The first vehicle-mounted camera 11R includes a first lens unit 12R and a first image sensor 13R capturing images via the first lens unit 12R. The second vehicle-mounted camera 11L includes a second lens unit 12L and a second image sensor 13L capturing images via the second lens unit 12L.

The first lens unit 12R includes a first lens 21R, a first diaphragm 22R having a fixed aperture value, and a first lens case 23R housing the first lens 21R and the first diaphragm 22R. Similarly, the second lens unit 12L includes a second lens 21L, a second diaphragm 22L having a fixed aperture value, and a second lens case 23L housing the second lens 21L and the second diaphragm 22.

The first lens unit 12R includes a first optical information recording unit 24R in which optical information of the first lens unit 12R is recorded. The second lens unit 12L includes a second optical information recording unit 24L in which the optical information of the second lens unit 12L is recorded. The optical information recording units 24R and 24L are disposed on the cases 23R and 23L of the lens units 12R and 12L and can be read from outside. The optical information contains information such as a focus value, a sensitivity value (transmittance), and shading of the lens unit 12.

The first image sensor 13R and the second image sensor 13L include imaging elements 32R and 32L in two imaging substrates 31R and 31L separately arranged on the right and left sides, respectively. The first imaging element 32R includes a first sensitivity value recording unit 33R (see reference numeral 33 in FIG. 5) in which the sensitivity values of the first imaging element 32R are recorded, and the second imaging element 32L includes a second sensitivity value recording unit 33L (see reference numeral 33 in FIG. 5) in which the sensitivity values of the second imaging element 32L are recorded. The first sensitivity value recording unit 33R and the second sensitivity value recording unit 33L only need to be capable of readably recording the sensitivity value, and include such as a RAM, an EPROM, and an EEPROM. The sensitivity value of the lens unit 12 and the sensitivity value of the imaging element 32 according to the embodiment are a relative value that indicates luminosity.

The imaging substrate 31R of the first image sensor 13R and the imaging substrate 31L of the second image sensor 13L are coupled to a main substrate 41 via communication connection units 34R and 34L, respectively. External information which is captured through the lens units 12R and 12L into the first imaging element 32R and the second imaging element 32L, is transmitted from the imaging substrates 31R and 31L via the respective communication connection units 34R and 34L to the main substrate 41.

The main substrate 41 includes a power source unit 42, a video processing unit 43, and a recognition processing unit 44. The video processing unit 43 optically corrects signals from the imaging substrates 31R and 31L, and performs stereo matching processing to obtain three dimensional information (hereinafter, parallax image). The recognition processing unit 44 extracts necessary information using the videos corrected with the video processing unit 43 and the obtained parallax image.

Figure 5:
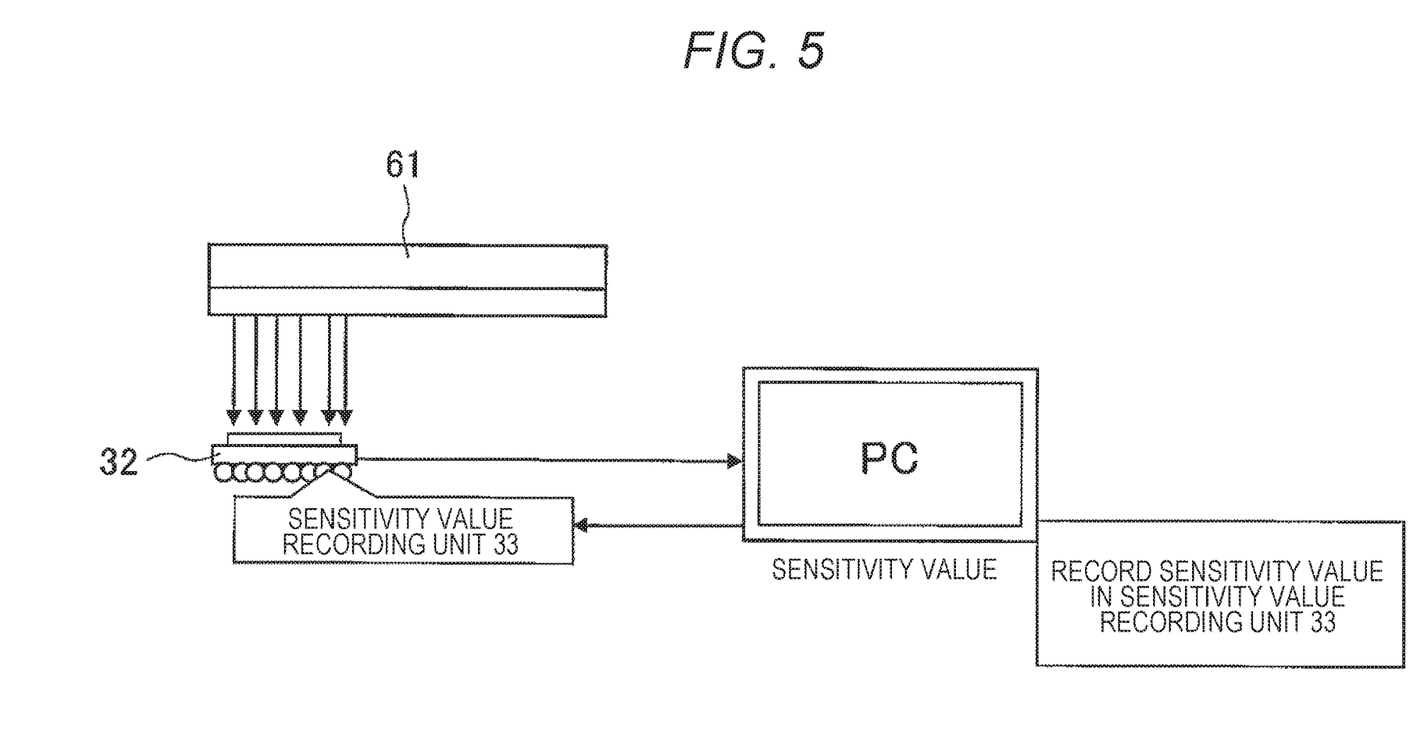
FIG. 5 is a diagram illustrating an exemplary method for storing a sensitivity value in a sensitivity value recording unit of an image sensor.

FIG. 5 is a diagram illustrating an exemplary method for storing a sensitivity value in a sensitivity value recording unit of an imaging element.

Operations for recording the sensitivity value in the sensitivity value recording unit 33 of the imaging element 32 may be performed in a manufacturer of the imaging element 32 before the factory shipment, for example. More specifically, a light source 61 which emits uniform amount of light over a predetermined range, is imaged with the imaging element 32. The sensitivity value of the obtained image is measured with a computer PC. Subsequently, the own sensitivity value as a measurement result is recorded in the sensitivity value recording unit 33.

Therefore, when the stereo camera 1 is assembled, it is possible to select a pair of imaging elements 32 forming a pair by reading the sensitivity value by communicating with the imaging element 32. More specifically, the two imaging elements 32 are selected such that a sensitivity variation width between the sensitivity values of one imaging element 32 and the sensitivity values of the other imaging element 32 is within a predetermined reference width.

For the stereo camera 1 that employs the two imaging elements 32 selected in this manner, the sensitivity variation width between the sensitivity values of the first imaging element 32R recorded in the first sensitivity value recording unit 33R and the sensitivity values of the second imaging element 32L recorded in the second sensitivity value recording unit 33L is within a predetermined reference width. That is, when the vehicle-mounted camera 11R in the right side and the vehicle-mounted camera 11L in the left side each receive light from the predetermined light source 61, a difference between a first signal level output from the imaging element 32R in the right side and a second signal level output from the imaging element 32L in the left side falls within a predetermined specified range. Therefore, this has an advantage of not causing a loss of operation time in comparison with the case of an evaluation of the sensitivity after assembly.

For example, when each of imaging elements 32 has the sensitivity variation width of about ±20%, combinations to upper and lower limit values of the sensitivity variation width are conceivable in a case of combining the right and left with no consideration of the selection. This may result in a sensitivity difference between right and left of up to 40%. On the other hand, in the present invention, the two imaging elements 32 are each selected to be combined based on the sensitivity value recorded in the sensitivity value recording unit 33, and accordingly it is possible to reduce the sensitivity variation width to keep the sensitivity variation within a predetermined reference width. For example, when upper and lower limit widths of sensitivity properties of the imaging element 32 are classified into two levels, the sensitivity variation width based on the combination of the right and left vehicle-mounted cameras 11R and 11L may be equal to or less than 50% in comparison with the sensitivity variation width before classification.

Figure 6:
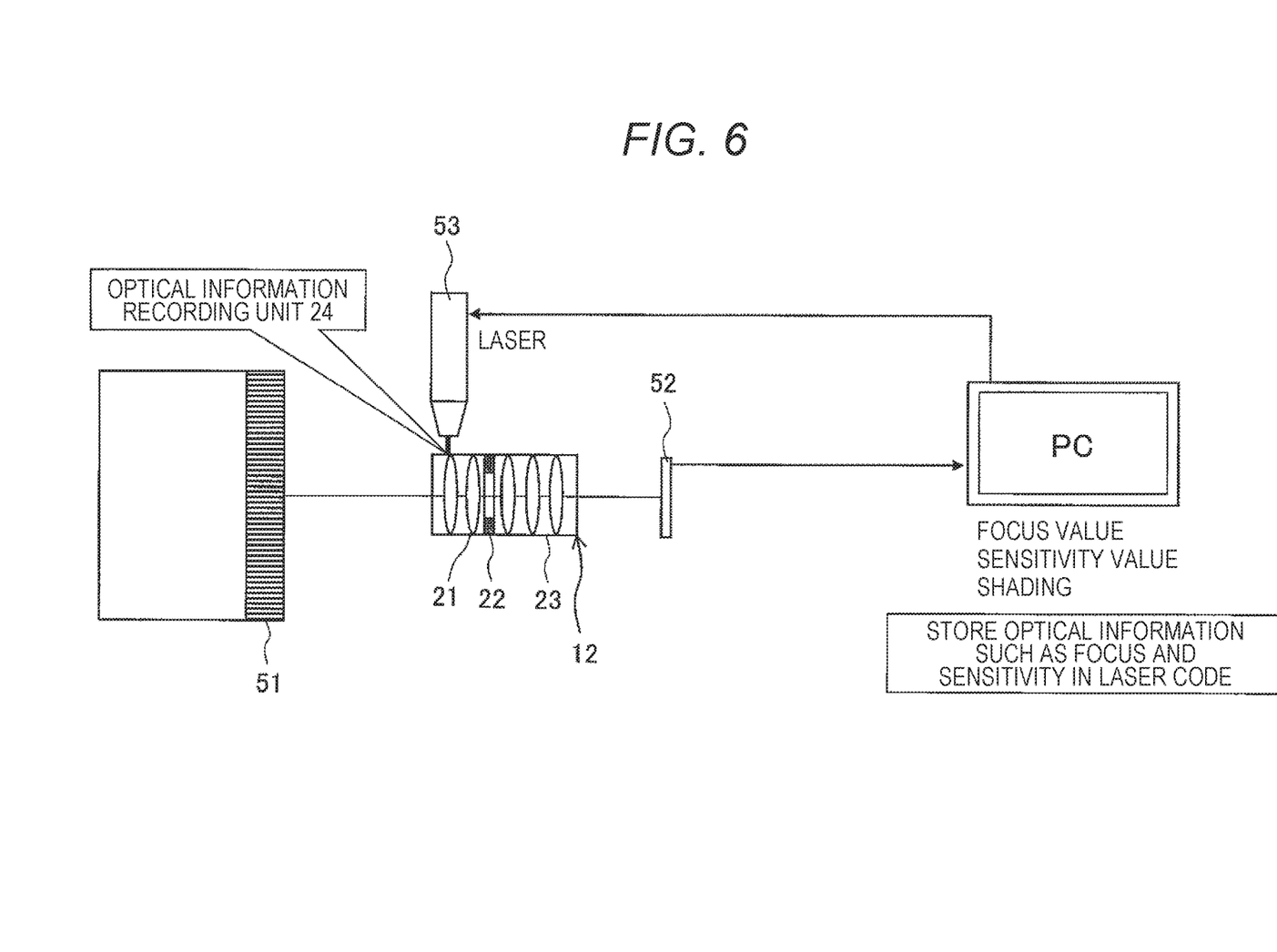
FIG. 6 is a diagram illustrating an exemplary method for recording optical information in an optical information recording unit of a lens unit.

FIG. 6 is a diagram illustrating an exemplary method for recording optical information in an optical information recording unit of a lens unit.

Operations for recording the optical information in the optical information recording unit of the lens unit 12 may be performed in a manufacturer of the lens unit 12 before the factory shipment, for example. More specifically, a predetermined chart 51 is captured through the lens unit 12 into imaging equipment 52. The optical information containing information such as the focus value, the sensitivity value, and the shading is obtained with the computer PC. Subsequently, the own optical information as a measurement result is recorded in the optical information recording unit 24. The recording of the optical information in the optical information recording unit 24 is performed by marking on the case 23 of the lens unit 12 with a laser 53. The optical information is read by an assembly operator, a reader or the like.

Therefore, when assembling the stereo camera 1, it is possible to read the optical information from the optical information recording unit 24 and appropriately select each of the right and left lens units 12 such that the sensitivity value of combined the lens unit 12 and the image sensor 13 becomes identical in the right and left vehicle-mounted cameras 11 and a desired sensitivity value. Accordingly, there is no loss of operation time in comparison with the case of performing an evaluation of the sensitivity after assembly. The optical information may be converted into a bar code or the like to be recorded.

Figure 7:
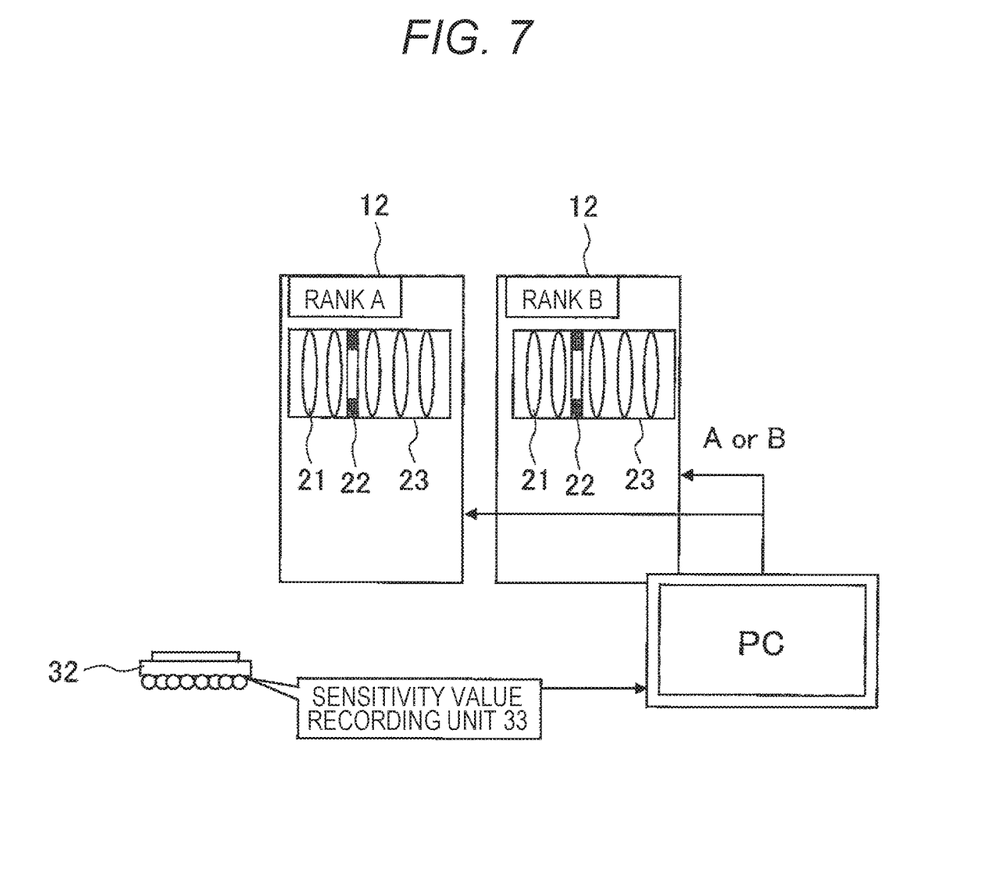
FIG. 7 is a diagram illustrating a method for selecting combination of the image sensor and the lens unit.

Hereinafter, an exemplary method for selecting combination of the image sensor and the lens unit is described with reference to FIG. 7.

For the stereo camera 1, it is significant to adjust signal strength of the videos from the right and left imaging substrates 31R and 31L in the video processing unit 43. There are two methods for adjusting. One method (1) is to adjust the signal strength by digital signal processing of the obtained video information. The other method (2) is to adjust the sensitivity properties such as transmittance and the sensitivity values in whole optical system up to outputting the imaging element.

For the former method (1), any stereo camera having inherently lower signal level causes performance to be limited by its signal level, and thus causes problems for mass produced products. In the present invention, therefore, the latter method (2), in other words, the method for adjusting the sensitivity properties of the optical system or the imaging element is selected, thereby performing stereo matching processing with higher performance.

The lens units 12 are classified into an A rank a B rank, or the like based on the optical information and are arranged in equipment for each rank. The lens unit 12 compatible with the imaging element 32 is selected based on the sensitivity value read from the sensitivity value recording unit 33 of the imaging element 32 with the computer PC and is removed from the equipment classified in the ranks to be allocated.

For example, when the sensitivity value of the second lens unit 12L is higher than that of the first lens unit 12R, the second imaging element 32L having the sensitivity value equal to or less than the sensitivity value of the first imaging element 32R is combined. When the sensitivity value of the second lens unit 12L is lower than that of the first lens unit 12R, the second imaging element 32L having the sensitivity value equal to or more than that the sensitivity value of the first imaging element 32R is combined. Accordingly, it is possible to absorb, by a simple mechanism, the variations in the sensitivity values obtained by combining the sensitivity value of the optical system of the stereo camera 1 and the sensitivity value of the imaging element 32.

In the embodiment described above, the optical information of the lens unit 12 is read from the optical information recording unit 24. Alternatively, adjusting an aperture diaphragm diameter of the diaphragm 22 implemented within the lens unit 12 to be ranked intentionally may be considered. In this case, it is enough to only record the aperture diaphragm diameter as ranked information. This results in simplification of measuring the single lens unit 12 and cost reduction.

Although the case where the sensitivity value recording unit 33 is disposed in the imaging element 32 has been described as an example in the above-described embodiment, the embodiment is not limited to this structure. For example, the sensitivity value recording unit 33 may be included in the imaging substrate 31. The sensitivity value recording unit 33 is not limited to the one which records signals with such as a ROM, and may be r the one which displays on the imaging substrate 31 with a bar code or the like.

That is the detailed description of embodiments of the present invention. Note here that the present invention is not limited to the above-described embodiments, and may include various modification examples without departing from the spirit of the present invention recited in claims. For instance, the embodiments are described above in detail for explanatory convenience and the present invention is not always limited to the entire configuration described above.

A part of one embodiment may be replaced with the configuration of another embodiment, or the configuration of one embodiment may be added to the configuration of another embodiment. In the configuration of each embodiment in part, other configurations may be added, deleted or replaced.

REFERENCE SIGNS LIST 1 stereo camera
11R first vehicle-mounted camera
11L second vehicle-mounted camera
12R first lens unit
12L second lens unit
32R first imaging element
32L second imaging element
33R first sensitivity value recording unit
33L second sensitivity value recording unit

The invention claimed is:

1. A stereo camera comprising:
a first vehicle-mounted camera comprising a first lens unit and a first image sensor configured to perform imaging via the first lens unit; and
a second vehicle-mounted camera comprising a second lens unit and a second image sensor configured to image via the second lens unit,
wherein the first image sensor has a first sensitivity value memory in which a sensitivity value of the first image sensor is recorded,
wherein the second image sensor has a second sensitivity value memory in which a sensitivity value of the second image sensor is recorded,
wherein a sensitivity variation width between the sensitivity value of the first image sensor recorded in the first sensitivity value memory and the sensitivity value of the second image sensor recorded in the second sensitivity value memory is within a predetermined reference width, wherein the sensitivity values are transmittance values,
wherein the first lens unit comprises a first optical information memory in which a sensitivity value of the first lens unit is recorded,
wherein the second lens unit comprises a second optical information memory in which a sensitivity value of the second lens unit is recorded, and
wherein whichever of the first image sensor and the second image sensor has a lower sensitivity value is combined with whichever of the first lens unit and the second lens unit has a higher sensitivity value.

2. The stereo camera according to claim 1,
wherein the first lens unit and the second lens unit have, respectively, diaphragms fixed at aperture values different from each other, and
out of the first image sensor and the second image sensor, the lens unit combined with the image sensor having the higher sensitivity value has the higher aperture value of the diaphragm than the lens unit combined with the image sensor having the lower sensitivity value.

3. The stereo camera according to claim 2,
wherein when the first vehicle-mounted camera and the second vehicle-mounted camera receive light from a predetermined light source, a difference between a first signal level output from the first image sensor and a second signal level output from the second image sensor is within a predetermined specified range.

4. The stereo camera according to claim 1,
wherein, when the sensitivity value of the second image sensor is equal to or less than the sensitivity value of the first image sensor and the sensitivity value of the second lens unit is higher than the sensitivity value of the first lens unit, the second image sensor is combined with the second lens unit, and when the sensitivity value of the second image sensor is equal to or more than the sensitivity value of the first image sensor and the sensitivity value of the second lens unit is lower than the sensitivity value of the first lens unit, the second image sensor is combined with the second lens unit.

* * * * *